(12) United States Patent
Biggs et al.

(10) Patent No.: US 8,285,652 B2
(45) Date of Patent: Oct. 9, 2012

(54) VIRTUAL ROBOT INTEGRATION WITH SEARCH

(75) Inventors: Todd Biggs, Kirkland, WA (US); Campbell Gunn, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 12/116,968

(22) Filed: May 8, 2008

(65) Prior Publication Data

US 2009/0281966 A1 Nov. 12, 2009

(51) Int. Cl.
G06F 17/00 (2006.01)
G06F 17/20 (2006.01)
G06F 7/00 (2006.01)
G06F 17/30 (2006.01)

(52) U.S. Cl. ............... 706/11; 707/706; 707/722
(58) Field of Classification Search .................. None
See application file for complete search history.

(56) References Cited

U.S. PATENT DOCUMENTS

| | | | |
|---|---|---|---|
| 6,629,087 B1 | 9/2003 | Benson et al. | |
| 6,754,647 B1 | 6/2004 | Tackett et al. | |
| 7,107,261 B2 | 9/2006 | Farrett | |
| 7,603,413 B1* | 10/2009 | Herold et al. | 709/204 |
| 7,685,192 B1* | 3/2010 | Scofield et al. | 707/709 |
| 7,870,199 B2* | 1/2011 | Galli et al. | 709/206 |
| 2002/0013782 A1 | 1/2002 | Ostroff et al. | |
| 2002/0169854 A1 | 11/2002 | Tarnoff | |
| 2002/0169865 A1* | 11/2002 | Tarnoff | 709/223 |
| 2003/0182391 A1 | 9/2003 | Leber et al. | |
| 2005/0125370 A1 | 6/2005 | Brennan et al. | |
| 2005/0171936 A1* | 8/2005 | Zhu | 707/3 |
| 2007/0172063 A1 | 7/2007 | Biggs et al. | |
| 2007/0239777 A1* | 10/2007 | Toomey | 707/104.1 |

FOREIGN PATENT DOCUMENTS

WO 03073324 A1 9/2003

OTHER PUBLICATIONS

Neves, Andre et al.; "XbotML: A Markup Language for Human Computer Interaction via Chatterbots"; 2005; Lecture Notes in Computer Science; pp. 171-181.*

(Continued)

*Primary Examiner* — Jeffrey A Gaffin
*Assistant Examiner* — Stanley K Hill
(74) *Attorney, Agent, or Firm* — Mayer & Williams P.C.

(57) ABSTRACT

An arrangement for virtually integrating a bot with a search functionality provided by an online search engine enables users of personal computers ("PCs"), mobile phones, and other devices to locate bot content in response to their search queries. The virtual integration enables bot content to be surfaced via the search engine. In response to a query, the search engine may return search results including links to one or more bots that are located on a presence-based network. When the user clicks on a link, a client application is launched on the PC or device that enables the user to converse with the bot using a natural language interface. The virtual integration also provides the bot with context of the user's last known query, or the query history. The bot can then start the conversation at a specific point within the bot's content hierarchy to respond to and answer the user's query.

16 Claims, 9 Drawing Sheets

OTHER PUBLICATIONS

Domingues, Maria et al.; "Printed Media, Hypertext and Chatterbots in Learning—A Comparative Study"; 2005; IFIP Advances in Infomation and Communication Tecnology, vol. 167/2005; pp. 239-245.*

Kusch, Matthias; "Information Agent Technology for the Internet: A Survey"; 2001; Elsevier; Data & Knowledge Engineering; vol. 36, Issue 3; pp. 337-372.*

Shawar, Bayan Abu et al.; "A Comparison Between Alice and Elizabeth Chatbot Systems"; 2002; University of Leeds; School of Computing Research Report Series—Report 2002.19; pp. 1-21.*

Goh, Ong Sing et al.; "Intelligent Agent Technology in E-commerce"; 2003; IDEAL 2003, LNCS 2690; pp. 10-17.*

Jia, Jiyou; "The Study of the Application of a Keywords-based Chatbot System on the Teaching of Foreign Languages"; 2003; eprint arXiv:cs/0310018; pp. 1-11.*

"AdSense mediapartners bot adding to the Google search index", http://www.jensense.com/archives/2006/04/adsense_mediapa.html.

"MSN search bot a glimpse of ambitions", http://www.news.com/2100-1032_3-1018930.html.

"Wine Robot", http://www.winerobot.com.au/about_us.html.

"btbot: BitTorrent Search Engine", http://www.btbot.com/about.html.

* cited by examiner

🪟 Live Search  [ Sonoma sparkling wine         🔍 ]

Web 1 - 10 of 1,470,000 results
See also Images, Video, News, Maps, More ▼

921 {
Sonoma Sparkling Wine
Dignissim iriure, zzril nulla nonummy nulla zzril consectetuer dolor dolore tincidunt. Consequat suscipit nibh nisl vel enim ad duis vero ut at ...
www.sonomawine.net/sparkling

914 {
Talk with the Wine Bot
Hi, I'm the wine bot and I can talk with you about sparkling wines that are produced in Sonoma County, California. I can answer your questions about Sonoma sparkling wines and provide additional information as well. Did you know that sparkling wine is commonly referred to as Champagne?
winebot@thewinebot.com 926 {
Visit Sonoma County
Ut et eu velit hendrerit volutpat ut duis dolore duis sparkling wine, vero odio suscipit, autem in. Consequat odio at tation quis enim vero ea feugait ex lorem wisi praesent luptatum ut ...
www.visitsonoma.com/wine

...

[1] [2] [3] [4] [5] Next

VIRTUAL ROBOT INTEGRATION WITH SEARCH

BACKGROUND

Robot applications (sometimes called "bots" for short) are applications which may appear as a contact on one or more presence-based networks, have an ID (identification), presence, can be added to a contact list, and with which users can interact just as they would with other human users on the networks. Presence-based networks are those which define the availability and receptivity of contacts to engage in real-time communications. Today these robot applications are primarily found on instant messaging ("IM") networks, but can be found on Voice over Internet Protocol ("VoIP") and other presence-based networks.

Robot applications may contain detailed information (i.e., content) to answer users' questions, for example, about products, services, history, geography, or any other topic for which one of the robot applications has been programmed to discuss. Robot applications typically support the interactions with users by using locally available resources, or by accessing remote resources with which they may interact through application programming interfaces ("APIs").

While robot applications are proving to be valuable sources of information for many users, finding them can often be difficult. For example, users today typically utilize one of the popular online search engines when looking to find information and answers about a particular topic of interest. But when users search for information and answers using search engines, the search results do not presently enable users to find, find and link to, or start an interaction with the content that is available from the robot applications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for virtually integrating a bot with a search functionality provided by an online search engine enables users of personal computers ("PCs"), mobile phones, and other devices to locate bot content in response to their search queries. The virtual integration enables knowledge, content, or interactive capabilities of the bot (referred to here as "bot content") to be surfaced via the search engine. In response to a query, the search engine may return search results including links to one or more bots that are located on a presence-based network. When the user clicks on a link, a client application is launched on the PC or device that enables the user to converse with the bot using a natural language interface. The virtual integration of the bot with the search engine also provides the bot with context of the user's last known query, or the query history. The bot can then start the conversation at a specific point within the bot's content hierarchy to respond to and answer the user's query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
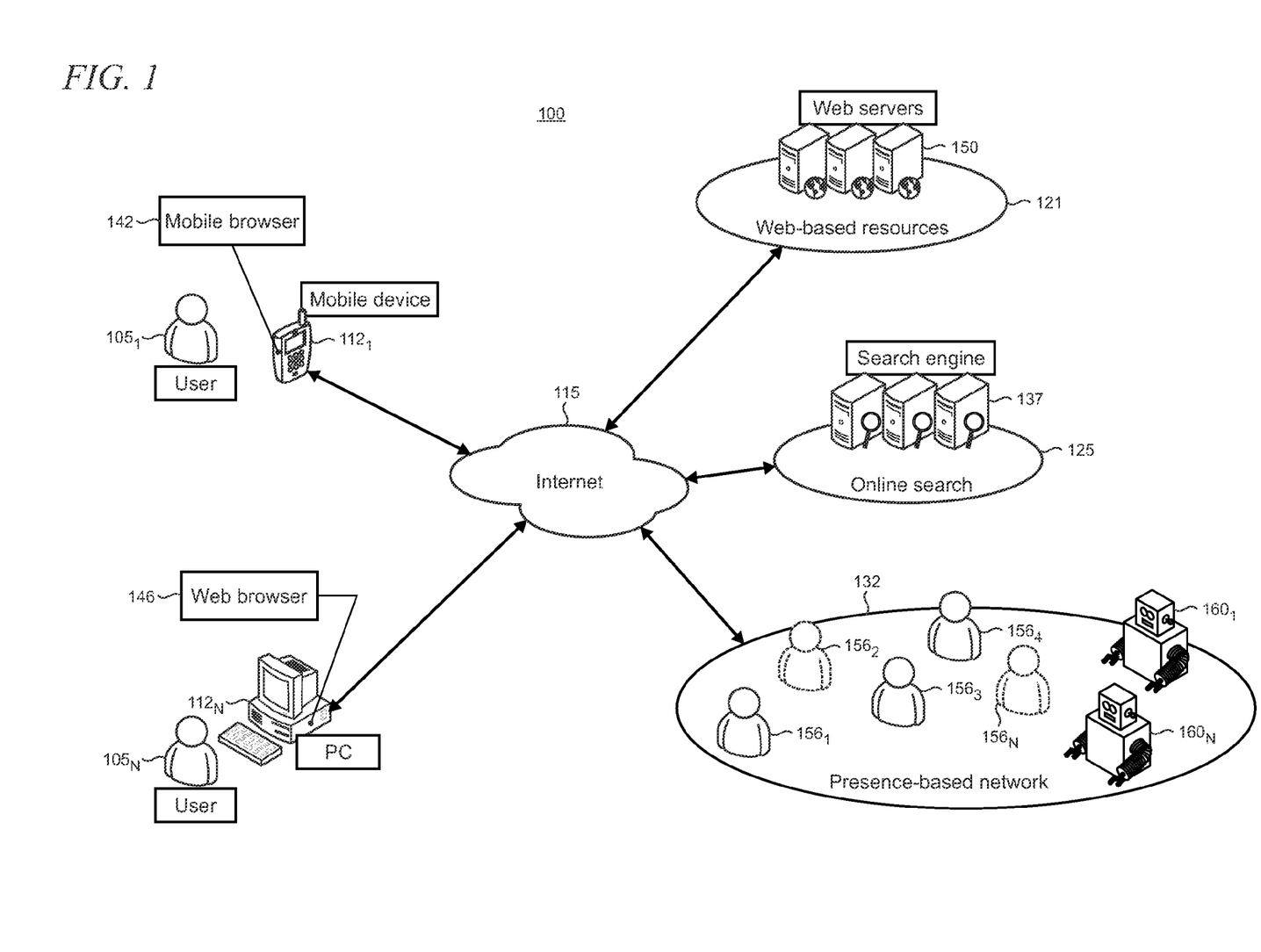
FIG. 1 shows an illustrative computing environment in which the present virtual bot integration with a search functionality may be implemented.

FIG. 1 shows an illustrative computing environment 100 in which the present virtual bot integration with a search functionality may be implemented. In this example, users $105_1 \ldots N$ use respective computing devices including a mobile device $112_1$ and PC $112_N$ to connect to the Internet 115 to access various online resources including, for example, the web-based resources 121, online search service 125, and the presence-based network 132 shown. Mobile device $112_1$ is representative of a variety of small and portable devices including, for example, mobile phones, smart phones, PDAs (personal digital assistant), handheld game devices, portable media players, and the like. Alternatives to PC $112_N$ include devices such as set top boxes, media centers, game consoles, and the like.

The online search service 125 includes a search engine number 137 with which the users 105 will typically interact using a browser functionality, for example a mobile browser 142 running on the mobile device $112_1$, or a web browser 146 running on the PC $112_N$. In alternative implementations, a user 105 may interface with the search engine 137 through, for example, a desktop search application or another application that is configured to interface with a search engine API (application programming interface).

The search engine 137 is typically configured to crawl resources located on the Web such as Web servers 150 in order to compile an ongoing index of Web addresses (i.e., URLs—Uniform Resource Locators) and analyze content contained in the pages at those addresses which it can index and store in a database. When a user 105 submits a query through a browser to the search engine 137 in the form of one or more keywords, the search engine will typically compare it with the information in its index and report back any matches.

In this example, the presence-based network 132 is arranged as an IM network that supports multiple contacts $156_{1, 2 \ldots N}$ that typically represent other people with whom the users 105 may interact in real-time conversations over the Internet 115. Presence-based networks are arranged to communicate the availability of contacts (i.e. their status as being online or off-line) to users. Here, contacts $156_1$, $156_3$ and $156_4$ are currently online while contacts $156_2$ and $156_N$ are off-line (as indicated by the dashed lines) which the presence-based network 132 communicates to the users 105.

Figure 2:
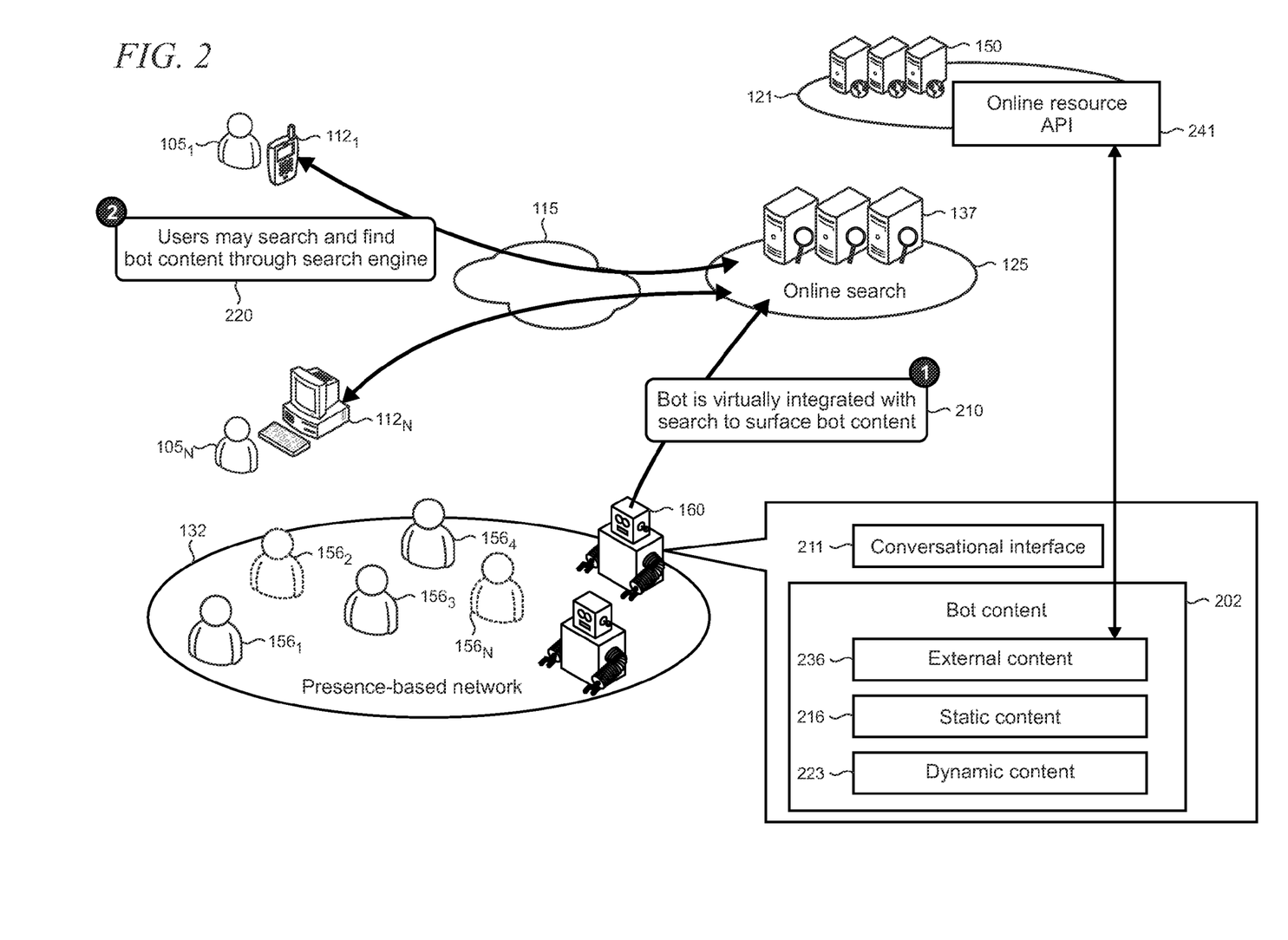
FIG. 2 shows an illustrative arrangement in which a bot is virtually integrated with a search functionality to surface bot content to device users who may search and find the content.

The presence-based network 132 is also configured to support robot applications (referred to here as "bots") as indicated by reference numerals $160_{1 \ldots N}$. As shown in FIG. 2, one or more of the bots 160 in the presence-based network 132 may be configured for virtual integration with a search functionality provided by the search engine 137 to thus be able to surface bot content 202 to the users 105, as indicated by reference numeral 210. The users 105 may then search and find the bot content through the search engine 137, as indicated by reference numeral 220. As noted above, bot content 202 may generally include knowledge, content, or interactive capabilities that the bot 160 may expose through a conversational interface 211 to the users 105.

Figure 3:
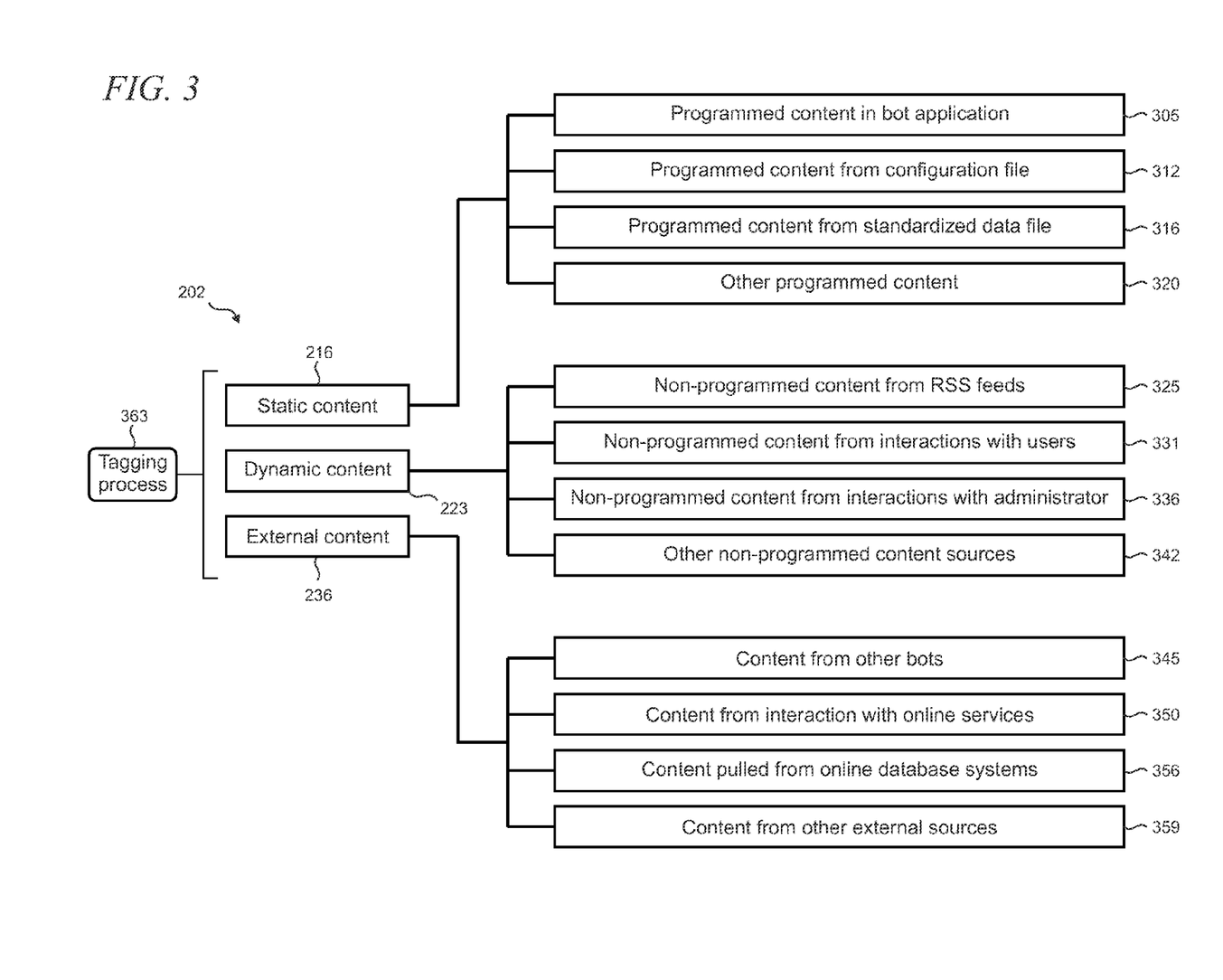
FIG. 3 shows illustrative categories and subcategories of bot content.

In this example, the bot content 202 more specifically includes static content 216, dynamic content 223, and external content 236. Static content 216 is content that has been specifically programmed into the bot 160. This may include, for example content that is programmed into the bot application 305 itself, programmed content from configuration files 312, programmed content from standards based files 316 such as AIML (Artificial Intelligence Markup Language) or XML (eXtensible Markup Language), or other types of programmed content 320.

The dynamic content 223 is generally not specifically programmed into the bot 160. Instead, dynamic content 223 is typically gathered and integrated over time using a variety of means. The dynamic content 223 may be collected, for example, from RSS (Really Simple Syndication) feeds 325, from interactions with users 331, from interactions with an application administrator 336, or from other non-programmed content sources 342.

The external content 236 may include, for example, content received through interactions with other bots 345, content received through interactions with a broad range of online services 350 which make APIs available through which information and service may be accessed, content pulled from any of a variety of database systems 356, and content from other external sources 359. Referring back to FIG. 2, the external content 236 is accessed in this example using an online resource API 241 which exposes resources contained on the Web servers 150.

FIG. 3 shows illustrative categories and subcategories of the bot content 202 which may be utilized in a given implementation of the present arrangement. However, it is emphasized that the categories and subcategories shown are intended to be exemplary, and the specific categories and subcategories of bot content utilized in a particular implementation may vary from that shown in FIG. 3.

As shown in FIG. 3, the bot content 202 may be subject to a tagging process 363 which may assist the search engine 137 to index specific pieces of content. Tags may be implemented as metadata that is normally not seen by a user 105, for example, to communicate information such as self-describing data that the search engine 137 may use to help optimize the indexing of the bot content 202 and/or determine where to rank the content in the results it returns to the user 105 in response to a query. As not all search engines support tagging, the tagging process 363 may generally be viewed as an optionally utilized process.

Figure 4:
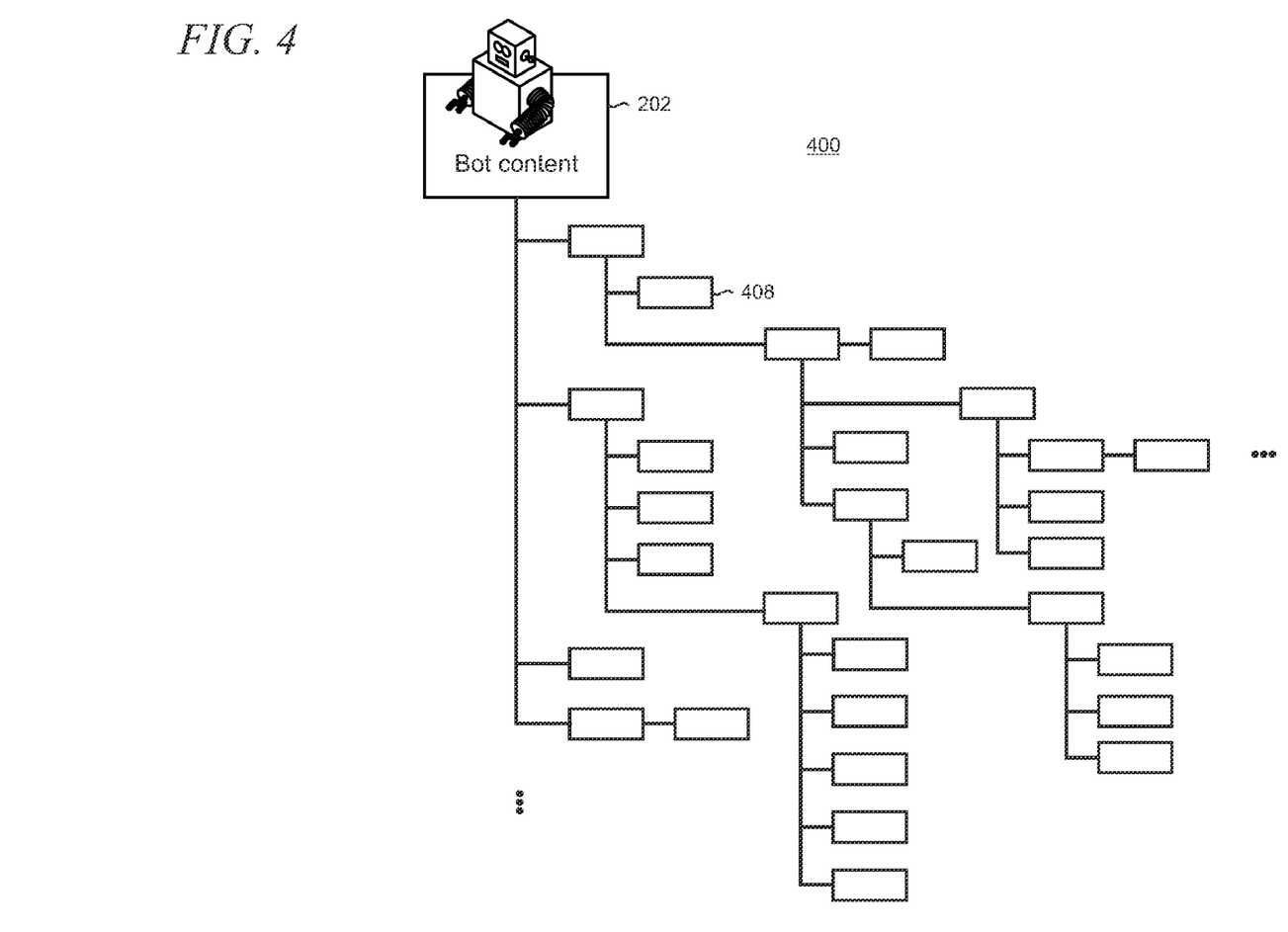
FIG. 4 shows an illustrative content hierarchy for bot content.

The bot content 202 will typically be organized in a hierarchy that is traversed according to the bot programming, the user's query and the interaction with the user 105 during a conversation. That is, the specific pieces of content (e.g., static, dynamic, and external content) will be placed in nodes of the hierarchy. An illustrative bot content hierarchy 400 is shown in FIG. 4. It is emphasized that the bot content hierarchy 400 shown is arbitrary and is provided for illustrative purposes only. A particular content hierarchy used in any given implementation of the present arrangement may be expected to vary from that shown.

The bot 160 will walk various nodes (as representatively indicated by reference numeral 408) as may be necessary to locate pieces of content that are responsive to the query and user inputs according to the bot's programming in order to provide the desired interactive and dynamic user experience. As described below in more detail in the text accompanying FIG. 1, the content hierarchy 400 will normally be entered at a specific entry point so that the bot 160 can respond to, and answer, a recently entered query by the user 105 with the appropriate context.

Figure 5:
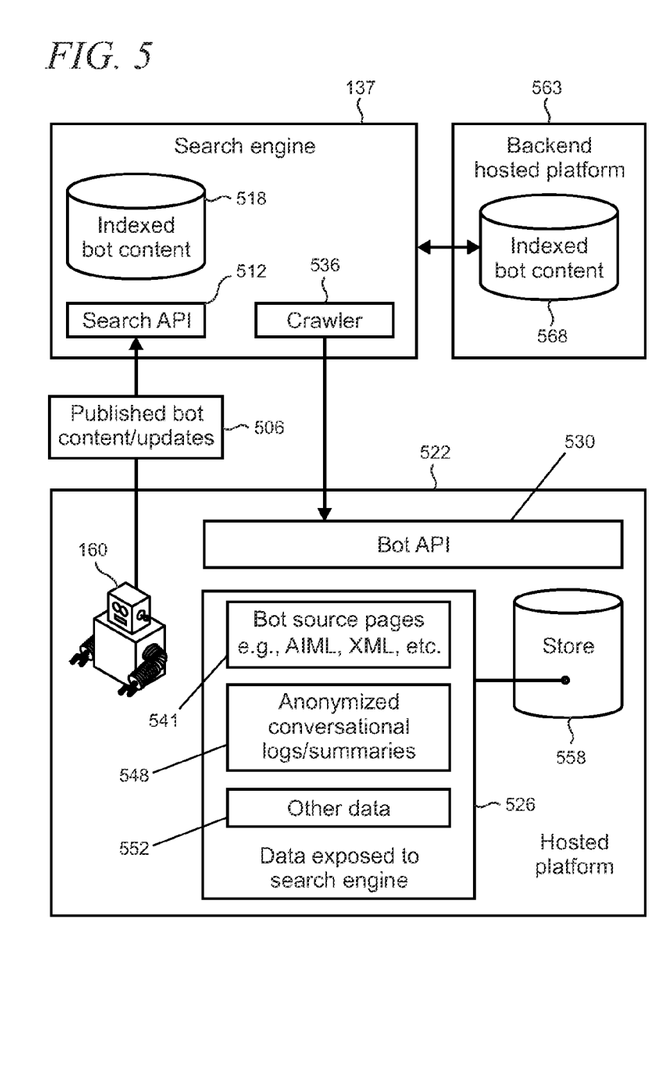
FIG. 5 shows an illustrative arrangement by which a bot may surface bot content through a search engine to a user.

FIG. 5 shows an illustrative arrangement by which a bot 160 may surface bot content 202 through the search engine 137 to a user 105. In one alternative, the bot 160 may publish bot content 202, or updates to the content (as collectively identified by reference numeral 506) to the search engine 137 through a search API 512 that is supported by the search engine. Such publication enables the search engine 137 to generate and/or utilize indexed bot content 518 so that the users 105 running queries through the search engine can find bots that may be able to answer their questions.

Figure 6:
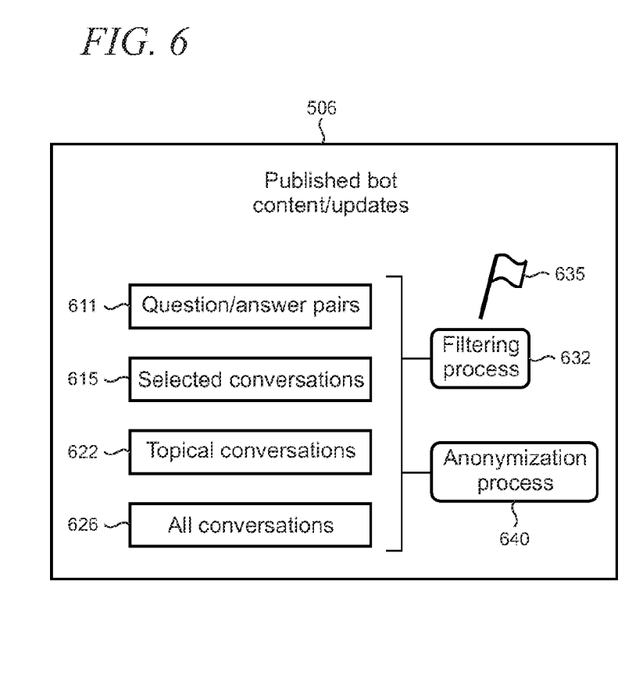
FIG. 6 shows illustrative categories for bot content which may be published via a search engine API (application programming interface)

The published content 506 may include, as shown in FIG. 6, question and answer pairs 611, pre-selected conversations 615 between the bot 160 and a user 105, conversations pertaining to a particular topic 622, or historical logs of all conversations 626, for example. The published content may be subject to a filtering process 632 that may apply a flag 635 (which may be implemented as a metadata tag, for example) to highlight and/or selectively publish certain content such as frequently or commonly used question and answer pairs.

The conversations 615, 622, and 626 may be published in whole or in part to the search engine 137. As it is possible for a given bot 160 to have many conversations (e.g., numbering in the thousands or millions over time), publishing the conversations can often be expected to be an effective way to surface the depth and breadth of the available bot content 202 to the users 105. In many applications it may also be desirable to apply an anonymization process 640 to remove personal information from the conversations prior to them being published to the search engine 137.

While a subset of the bot content 202 is published in this example, in alternative implementations it may be desirable for the bot 160 to publish its entire content database to the search engine 137.

Referring again to FIG. 5, in addition to the publication, the hosted platform 522 on which the bot 160 runs in the presence-based network 132 may be used to expose data 526 through a bot API 530 to a crawler 536 or similar functionality associated with the search engine 137. Such exposed data may include, for example, source pages 541 or other source data for the bot content 202 such as AIML or XML markup which the search engine 137 may index. Anonymized bot conversations 548, which may be similarly arranged as those that are published as described above, can also be exposed to the crawler 536 through the bot API 530 for indexing, as can other data 552. The hosted platform 522 will typically store the data exposed through the bot API 530 in a persistent store 558 or other database.

A hosted platform 563 that is integrated with a backend of the search engine 137 may also be used to surface indexed bot content 568. In this case, the search engine 137 may access indexed bot content directly. Accordingly, bot content may be surfaced by the search engine 137 and presented to the user through a variety of techniques including publication to the search API 512, crawling the bot content sources on the hosted platform 522, or direct access through the hosted platform 563 on the backend of the search engine. In some implementations a combination of the techniques may be utilized.

Figure 7:
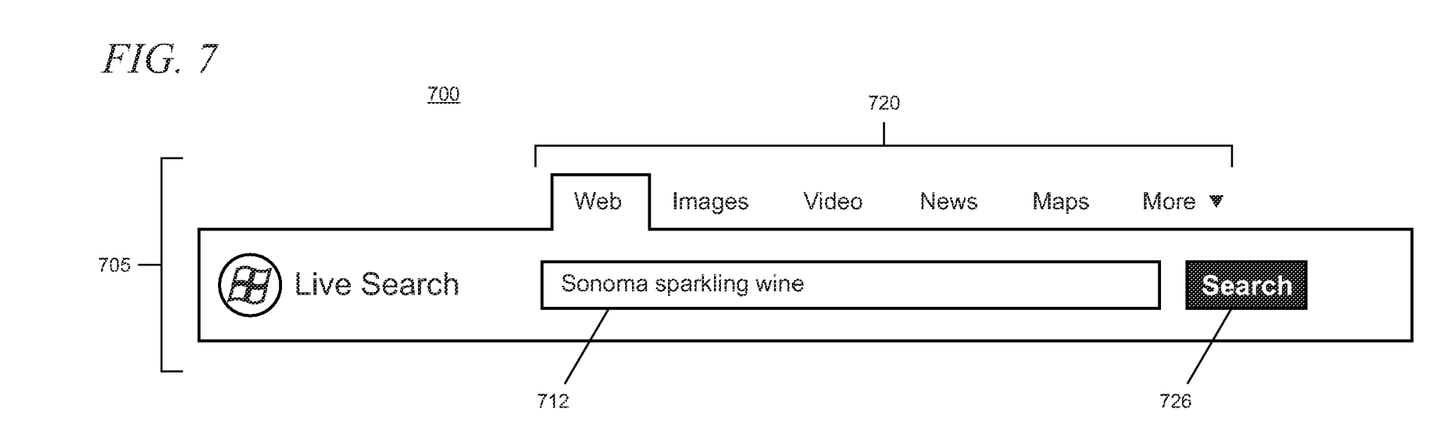
FIG. 7 shows an illustrative screen shot of a search engine user interface.

Turning now to the user experience supported by the present virtual integration of the bot and search, FIG. 7 shows an illustrative screen shot 700 of a user interface 705 that is associated with the search engine 137 and supported on the web browser 146. A user interface that is adapted to the capabilities of the mobile browser 142 would have similar features and functionalities as those shown in FIG. 7. In this example, the search engine 137 supports an online search service 125 that is part of the Microsoft Windows Live™ brand of online services which includes Live Search.

In this particular example, an illustrative scenario is shown and described where the user 105 has an interest in sparkling wines that are made in Sonoma County, Calif. in the United States. The user interface 705 includes a search entry box 712 where the user has entered the text string "Sonoma sparkling wine" as shown. The user 105 is provided with tabs (collectively identified by reference numeral 720) in the user interface 705 from which categories of search results may be selected (e.g., web, images, video, news, maps, and more). When the user 105 clicks on the "Search" button 726, the search engine 137 will return search results according to the selected category.

Figure 8:
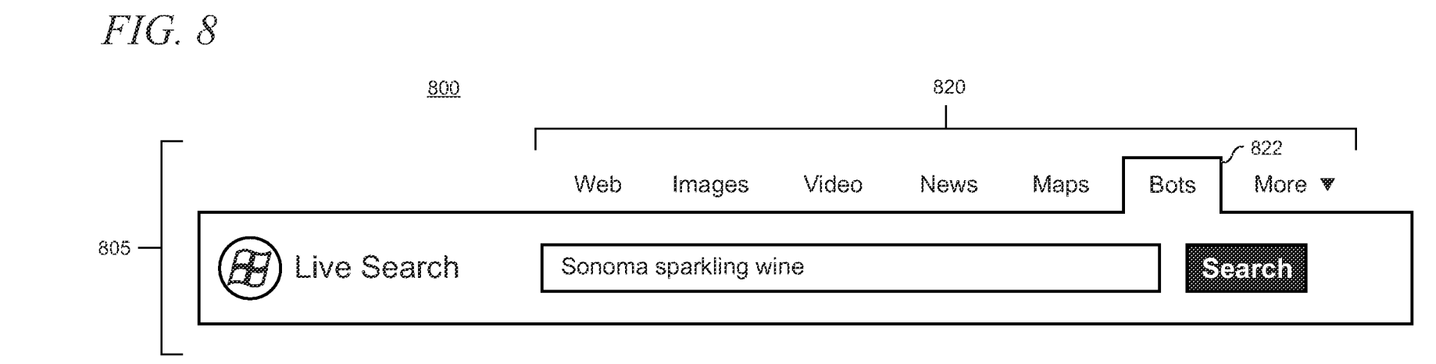
FIG. 8 shows an illustrative screen shot of an alternative search engine user interface.

The user interface 705 is arranged to appear in a standard or typical fashion in FIG. 7. That is, the user interface 705 is arranged primarily to accommodate existing searches that do not typically include content from bots. By comparison, the user interface 805 shown in the screen shot 800 of FIG. 8 includes a specific tab 822 for bots among the tabs 820. Such a specific bot search category may be utilized in some scenarios, and could be implemented for example, in a browser using a browser plug-in that the user 105 could download and install from the online search service 125 or other web service. In scenarios where a specific bot search category is not utilized, the bot search results would typically be included among results for regular web pages. This latter approach may be desired in some cases particularly when bots are relatively unfamiliar to the users 105. As users become more familiar with capabilities and features provided by bots, and become comfortable in using and searching for bots, the separate search category 822 for bot content may be more appropriately used. However, it is emphasized that the particular choice of standard or the currently non-standardized user interfaces will typically be dependent of the requirements of a given implementation.

Figure 9:
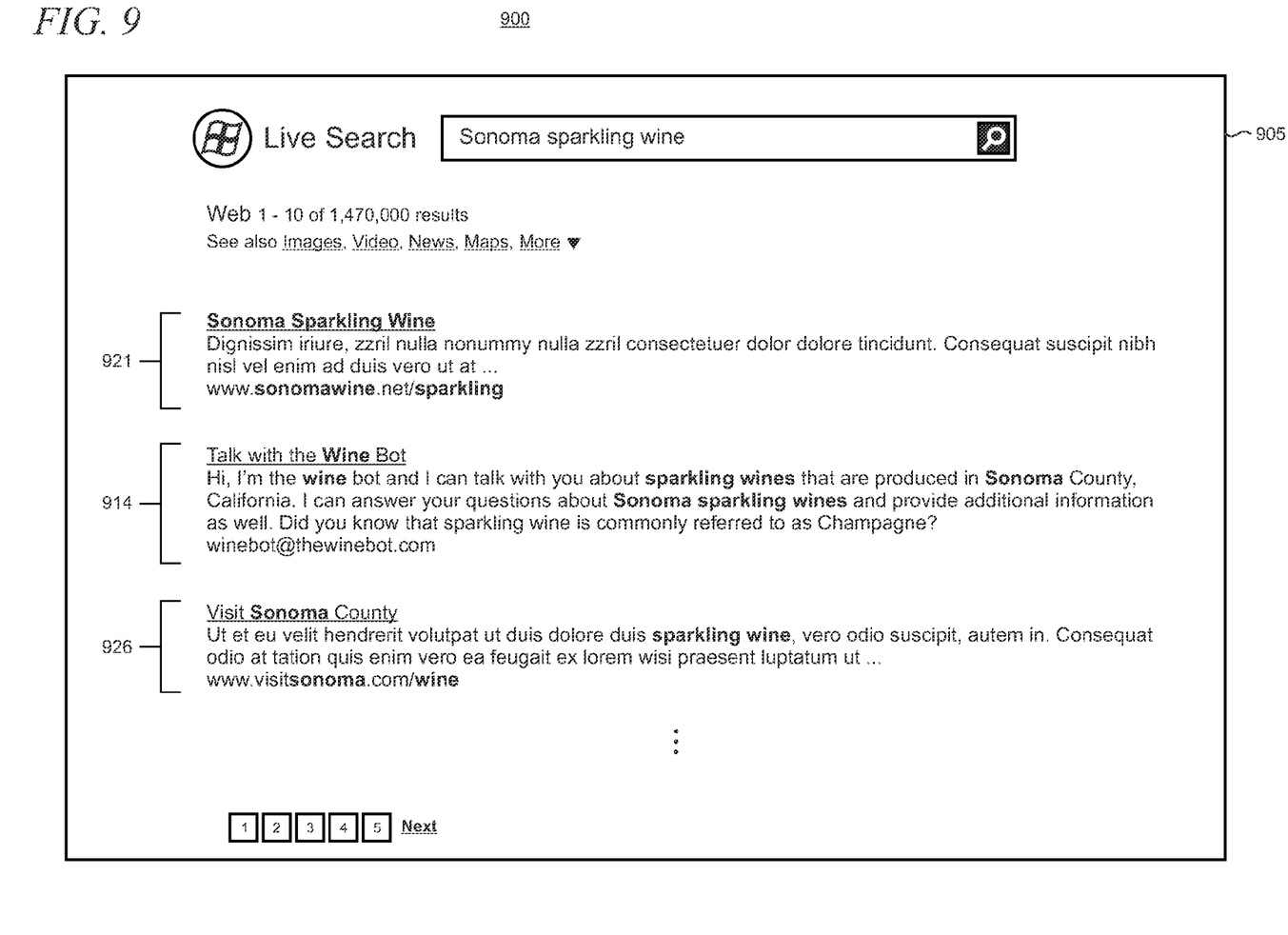
FIG. 9 shows an illustrative screen shot of an illustrative search engine results page that includes a link to a bot.

FIG. 9 shows an illustrative screen shot 900 of an illustrative search engine results page 905 that includes a link 914 to a bot. In this example, the link 914 to the bot is mixed with conventional results to web sites as indicated by respective reference numerals 921 and 926. However, in alternative arrangements where bot results are separately categorized the results page could be arranged to display only bots.

The results page 905 here is arranged to list the results by rank order in decreasing order of relevance as determined by the search engine 137. Typically, the search engine 137 will use the frequency of occurrence of the terms in the search string, among other factors, when determining the rank order. In this example, the bot 160 is configured to engage in interactive conversations with the user 105 about wine, and is accordingly named the "Wine Bot." The bot 160 is programmed in particular, relying on a combination of content categories and subcategories as shown in FIG. 3 and described in the accompanying text, to be able to provide information to the user 105 about sparkling wines produced in Sonoma County, Calif. in response to the query. A brief synopsis of the bot's expertise is provided in descriptive text accompanying the link 914. The text is typically generated by search engine 137 as it indexes the bot content 202.

Figure 10:
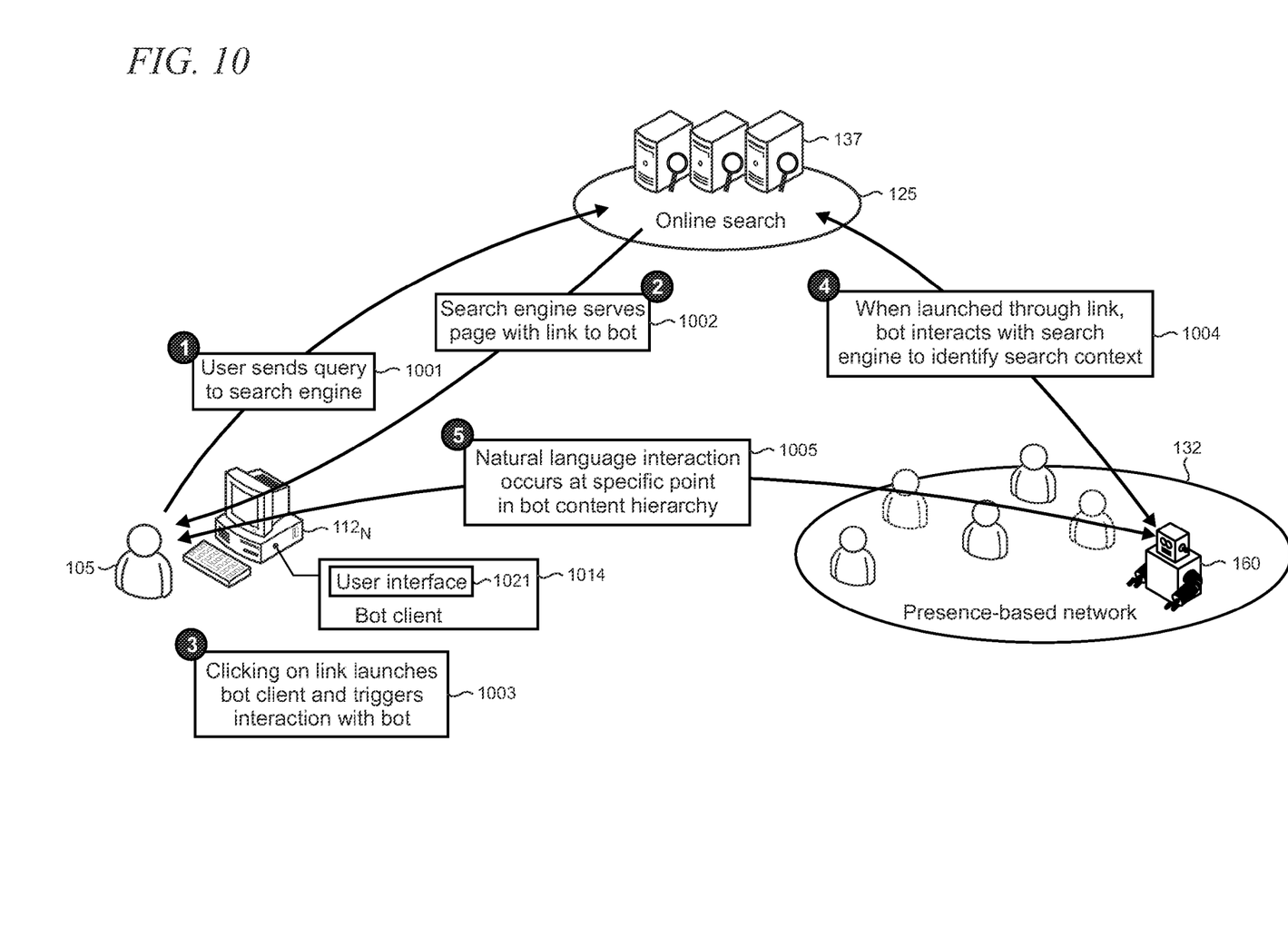
FIG. 10 shows an illustrative use scenario where a user may launch into an interaction with a bot at a specific point in its content hierarchy so that it will respond to and/or answer the query the user just entered into the search engine.

The present arrangement for virtual bot integration with a search functionality provided by a search engine is further adapted to enable the bot 160 to have awareness of the context of the user's search so that the interactive conversation with the bot may be started at an appropriate point in the bot content hierarchy 400. An overview of the process by which this occurs is shown in FIG. 10.

The user 105 begins by sending a query (e.g., "Sonoma sparkling wines") to the search engine 137 (as indicated by reference numeral 1001). While the user 105 is shown using the PC $112_N$, the process is similar for the mobile device $112_1$. The search engine 137 responds by serving the results page 905 which includes the link 914 to the Wine Bot (1002). When the user 105 clicks on the wine bot link 914, a local bot client 1014 is launched on the PC $112_N$ and interaction with the bot 160 is triggered (1003). The bot client 1014 facilitates real time communication capability with the bot 160, similar to that provided by an IM client, that may be implemented, for example, as a plug-in or add-on to the web browser 146 or be configured as a standalone application or agent. Typically, the bot client will provide a user interface 1021 by which the user 105 may see dialogue from the bot 160 and enter text to be sent to the bot to thereby engage in conversation.

When the bot 160 is triggered through activation of the link 914, it begins an interaction with the search engine 137 to become aware of the context of the user's search (1004) to thus enable a natural language interaction (1005) between the user 105 and the bot 160 which occurs at a specific and appropriate point in the bot content hierarchy 400 that is responsive to the user's query. Thus in this example, the bot 160 can begin a conversation with the user 105 that deals specifically with sparkling wines produced in Sonoma County, Calif.

Figure 11:
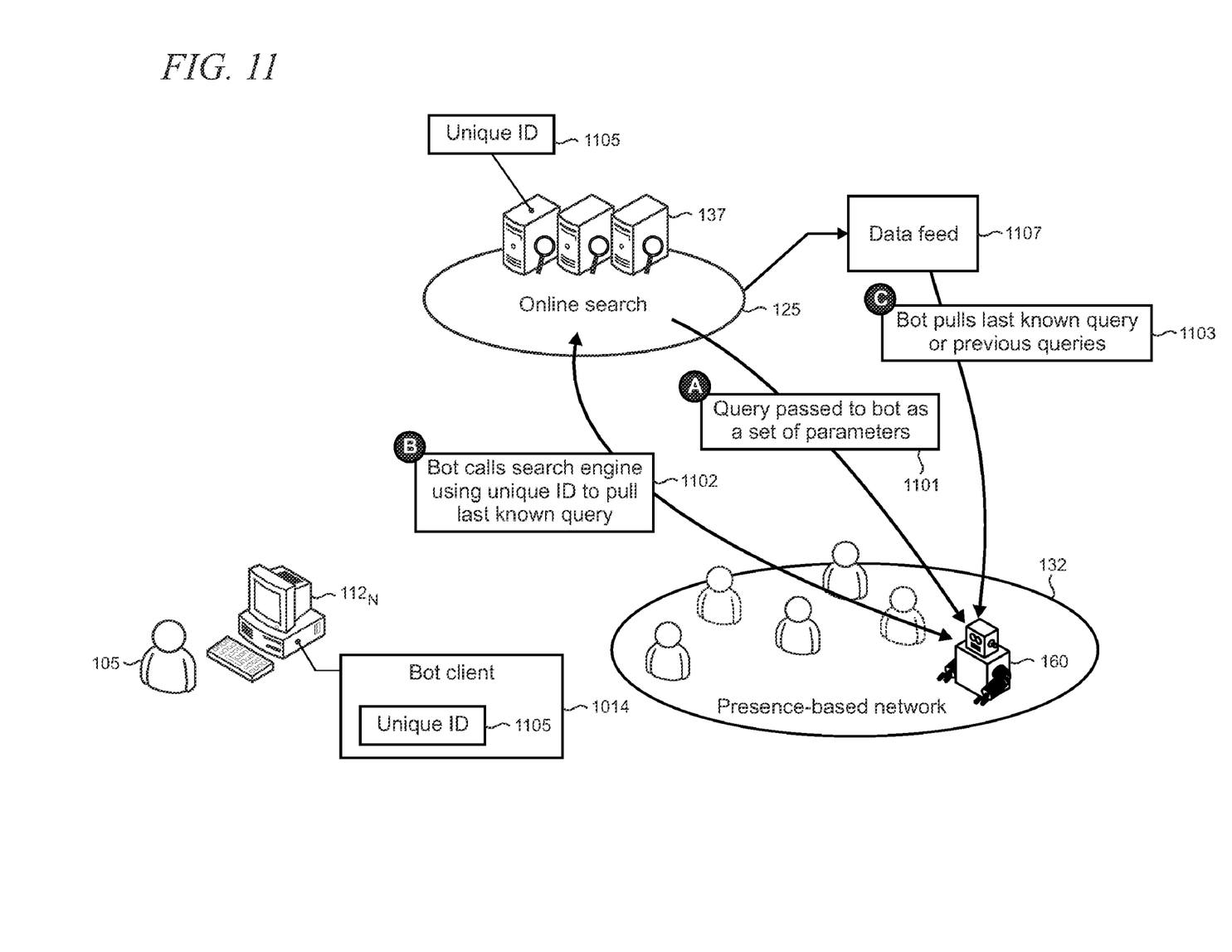
FIG. 11 shows illustrative alternative arrangements by which a bot may determine the last known query input by the user.

As shown in FIG. 11, the interaction between the bot 160 and the search engine 137 to gain an awareness of the context of the user's search may involve three alternative techniques (A, B, and C in the drawing). In technique A, the search query is passed from the search engine 137 to the bot 160. This may be accomplished, for example, by using a set of parameters that are passed to the bot 160 when it is launched out of the search engine 137 through activation of the link 914 (as indicated by reference numeral 1101):

msnim:chat?contact=winebot@winebot.net+sonoma+sparkling+wine where the "msnim" identifies the presence-based network as the MSN instant messaging network.

In technique B, the bot 160 calls the search engine 137 using a unique identifier 1105 for the user 105 which is common to both the search engine 137 and the bot client 1014 on the PC $112_N$. The unique identifier enables the last known query from the user 105 to be pulled down by the bot 160

(1102) and be used to locate the appropriate starting point for the conversation in the content hierarchy 400.

In technique C, a public or limited access data feed 1107 is utilized which the search engine 137 and/or online search service 125 makes available for, or on behalf of each user 105. The bot 160 may access the data feed 1107 to pull the last known query, or a collection of previous queries (1103) from which the bot 160 may determine the search context used to set the starting point in the content hierarchy 400 for its conversation with the user 105.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for virtually integrating a bot with an online search service, the method comprising the steps of:
    surfacing bot content for indexing by a search engine associated with the search service, the surfaced bot content being includable in a link contained in a results page returned by the search engine to a user of the online search service responsively to a query;
    responsively to the link being activated by the user, launching the bot to engage in a conversation with the user, enabling the user to converse with the bot using a natural language interface; and
    receiving at least a portion of the query from the search engine to enable the bot to begin the conversation with the user using bot content that has relevance to the query by identifying the user with a unique identifier that is shared with the bot so that the bot may utilize the unique identifier to pull a last known query input by the user.

2. The method of claim 1 in which the bot content comprises knowledge utilized by the bot when interacting with a user in the conversation, or interactive capabilities of the bot.

3. The method of claim 1 in which the bot content comprises at least one of static content, dynamic content, or external content.

4. The method of claim 1 in which the surfacing comprises publishing the bot content or updates to the bot content through an API associated with the search engine.

5. The method of claim 4 in which the published content includes at least one of question and answer pairs or anonymized conversational logs.

6. The method of claim 1 in which the surfacing comprises locating a database of indexed bot content in a hosted platform that is integrated with a back end of the search engine.

7. The method of claim 1 in which the surfacing comprises exposing one or more sources of the bot content through an API on a hosted platform on which the bot runs.

8. The method of claim 7 in which the one or more sources include configuration files or standards-based files, the standards-based files being one of AIML or XML.

9. The method of claim 7 in which the hosted platform is located on a presence-based network that is one of IM network or VoIP network.

10. A method for facilitating interaction with a bot, the method comprising the steps of:
    receiving an event at an electronic device, the event indicating that a link to the bot was activated by a user, the link being included in a search results page provided by a search engine in response to a query from the user;
    launching a client on the electronic device in response to the received event, the client arranged to facilitate an interaction between the user and the bot, wherein the query is exposed to the bot and identifies the user with a unique identifier such that the interaction begins at a point in a hierarchy of content used by the bot so that the interaction is responsive to the query; and
    receiving input from the user at a user interface on the client that is responsive to dialogue received from the bot and displayed on the user interface, wherein the user converses with the bot using a natural language interface.

11. The method of claim 10 the method comprising configuring the client as one of web browser plug-in, web-browser add-on, agent, or application.

12. The method of claim 10 comprising facilitating interaction with a bot, the method including a further step of sending the user input to the bot to facilitate a conversation between the user and the bot.

13. The method of claim 12 in which the conversation is conducted using natural language.

14. A method for enabling a user at a remote device to utilize a search engine to find bot content that is responsive to a query from the user, the method comprising the steps of:
    indexing bot content that is surfaced by a bot, the bot content being usable by the bot to engage in conversation with the user through a bot agent running on the remote device;
    parsing the query from the user, the query being formulated to include one or more search terms;
    providing a search results page that includes a link to the bot when the bot content has relevance to the one or more search terms; and
    exposing the query to the bot so that the bot may determine a point in its content hierarchy from which to begin the conversation with the user,
    in which the exposing comprises identifying the user with a unique identifier that is shared with the bot agent so that the bot may utilize the unique identifier to pull a last known query input by the user.

15. The method of claim 14 in which the remote device comprises one of personal computer or mobile device.

16. The method of claim 14 including a further step of launching the bot when the link to the bot is activated.

* * * * *